United States Patent [19]
Fujita et al.

[11] Patent Number: 5,341,306
[45] Date of Patent: Aug. 23, 1994

[54] BLANK LAYOUT METHOD FOR PLATE-GLASS CUTTERS

[75] Inventors: Hideyuki Fujita, Osaka; Masaharu Okafuji, Ichihara; Mitsunori Kawabe, Kitakyushi, all of Japan

[73] Assignee: Nippon Sheet Glass Co., Ltd., Osaka, Japan

[21] Appl. No.: 923,991

[22] PCT Filed: Feb. 5, 1992

[86] PCT No.: PCT/JP92/00118
 § 371 Date: Sep. 16, 1992
 § 102(e) Date: Sep. 16, 1992

[87] PCT Pub. No.: WO92/13808
 PCT Pub. Date: Aug. 20, 1992

[30] Foreign Application Priority Data
 Feb. 6, 1991 [JP] Japan .................................. 3-015527

[51] Int. Cl.⁵ .............................................. G06F 15/46
[52] U.S. Cl. .............................. 364/473; 364/474.13; 364/148
[58] Field of Search ................... 364/473, 468, 474.13, 364/148, 474.09, 474.15; 83/72–76, 76.1, 76.6–76.9; 65/DIG. 13, 158, 160, 97

[56] References Cited

U.S. PATENT DOCUMENTS

| | | | |
|---|---|---|---|
| 3,246,550 | 4/1966 | Galey et al. | 364/474.13 |
| 3,490,147 | 1/1970 | Brichard et al. | 364/148 X |
| 3,490,320 | 1/1970 | Valembois et al. | 364/148 X |
| 4,554,625 | 11/1985 | Otten | 364/474.13 X |

FOREIGN PATENT DOCUMENTS

| | | |
|---|---|---|
| 39-16630 | 8/1964 | Japan . |
| 5-37112 | 3/1976 | Japan . |
| 61-4147 | 2/1986 | Japan . |
| 61-4148 | 2/1986 | Japan . |
| 1127295 | 5/1989 | Japan . |
| 388737 | 4/1991 | Japan . |

*Primary Examiner*—Joseph Ruggiero
*Attorney, Agent, or Firm*—Ratner & Prestia

[57] ABSTRACT

A blank layout method for planning a product layout having a good yield for plate-glass cutters cutting a plurality of rectangular product plates from a rectangular glass blank is disclosed. When a product plate is laid out on a residual blank space of a glass blank, a plurality of candidate layout plans are prepared, and the same processing is recursively repeated for residual blank spaces in each of the candidate layout plans. The final yields of the candidate layout plans when no more products can be laid out are compared to select a candidate layout plan having the highest yield.

4 Claims, 13 Drawing Sheets

BLANK LAYOUT METHOD FOR PLATE-GLASS CUTTERS

TECHNICAL FIELD

This invention relates to a blank layout method for planning a product layout with a good yield in plate-glass cutters for cutting a plurality of rectangular product plates from a rectangular glass blank.

BACKGROUND ART

The plate-glass cutter lays out rectangular product plates requested to be cut from a rectangular glass blank. In the conventional blank layout method, the direction in which product glass plates being cut are laid out (in the longitudinal or transverse direction), and the direction in which the cutter line is drawn as the cutter travels (in the longitudinal or transverse direction) are determined on the basis of an empirical algorithm. A typical flow chart of the conventional blank layout method is shown in FIG. 1. The data structure referred to as instructions, in which information on a product type being cut (product number, product dimensions, and the number of residual products being cut) is stored, is sorted in the descending order of product area (STEP S1). This is done to improve the total yield by laying out product plates by giving priority to those of larger sizes. Next, the dimensions of a glass blank are set as the initial blank space (STEP S2). Instructions are then extracted sequentially one after another from the instruction list (STEP S3), and the largest possible number of those products are laid out on all the residual blank spaces. There are a plurality of residual blank spaces as the glass blank is divided by cutter lines in laying out products. In order to improve the yield by preferentially laying out products on smaller residual blank spaces, the residual blank spaces are sorted in the ascending order of size (STEP S4), and extracted in that order (STEP S5) to lay out products on the residual blank spaces. When products are laid out on a residual blank space, a product (glass plate) is first laid out in the longitudinal direction, or in the transverse direction if cutting in the longitudinal direction is impossible. The residual products being cut, if any, are laid out continuously in the same direction by extending the cutter line sideways. If only one product is laid out, the cutter line dividing the residual blank spaces is extended in such a direction that larger residual blank spaces are left (STEP S6). The availability of the next residual blank space is judged (STEP S7). If the next residual blank space is not available, divided residual blank spaces are added (STEP S8), the next instruction is extracted (STEP S9), and the same steps are repeated. As described above, the direction in which products are laid out, and the direction in which cutter line is drawn are determined on the basis of an empirical algorithm in the conventional blank layout method. For this reason, only one set of the type of product being laid out, the layout direction and cutter-line direction is sought and used. This prevents the yield from being improved. If one type of product A is laid out on a glass blank 10, as shown in FIG. 2A, for example, only six pieces of products can be laid out in the conventional method. If products A in the lower row are arranged in the transverse direction, as shown in FIG. 2B, however, one more piece of product can be obtained.

DISCLOSURE OF THE INVENTION

It is an object of this invention to provide a blank layout method for plate-glass cutters in which a plurality of candidate layout plans having different layout and cutter-line directions and the types of products are prepared when laying out rectangular product glass plates from a rectangular glass blank, and the optimum blank layout plan is selected from among the candidate layout plans to improve layout yield in the plate-glass cutters.

This invention is concerned with a blank layout method for plate-glass cutters for automatically preparing a plan to lay out a plurality of rectangular product plates of a plurality of types from a rectangular glass blank characterized in that a product plate is first laid out on a glass blank, and then candidate layout plans having information on the positions of the first product plate and a plurality of residual blank spaces divided from the glass blank as the first product plate is cut are prepared as many as the number of possible combinations of the longitudinal or transverse layout directions and the longitudinal or transverse cutter-line directions; candidate layout plans for the next product plate are prepared for each of the candidate layout plans in the same manner as the preparation of candidate layout plans for the first product plate; this process being repeated recursively until no further layout becomes possible; the final yields of the candidate layout plans for each of the residual blank spaces are then determined, and a layout plan having the highest yield is eventually selected from among them.

According to this invention, when a plurality of product plates of the same type can be laid out on a single glass blank, layout is effected by regarding the product group as a single product.

According to this invention, when preparing candidate layout plans, candidate layout plans for different types of product plates are prepared simultaneously.

Furthermore, according to this invention, if there is redundant processing time available in preparing candidate layout plans by changing the types of product plates, candidate layout plans are prepared by sequentially increasing the number of types of product plates being cut, starting with 1, and the optimum layout plan is selected by comparing the candidate layout plans.

As described above, this invention makes it possible to improve layout yield when laying out rectangular product plates being cut on a rectangular glass blank by preparing candidate layout plans by changing the layout and cutter-line directions and the types of product plates being laid out, and selecting the optimum layout plan from among them.

BRIEF DESCRIPTION OF THE DRAWINGS

FIGS. 7B and 7C are exemplary candidate layout plan list; FIGS. 7B and 7C are exemplary candidate layouts.

FIGS. 10B, 10C, and 10D are exemplary candidate layouts.

FIGS. 11B and 11C are exemplary candidate layouts.

BEST MODE FOR CARRYING OUT THE INVENTION

Figure 1:
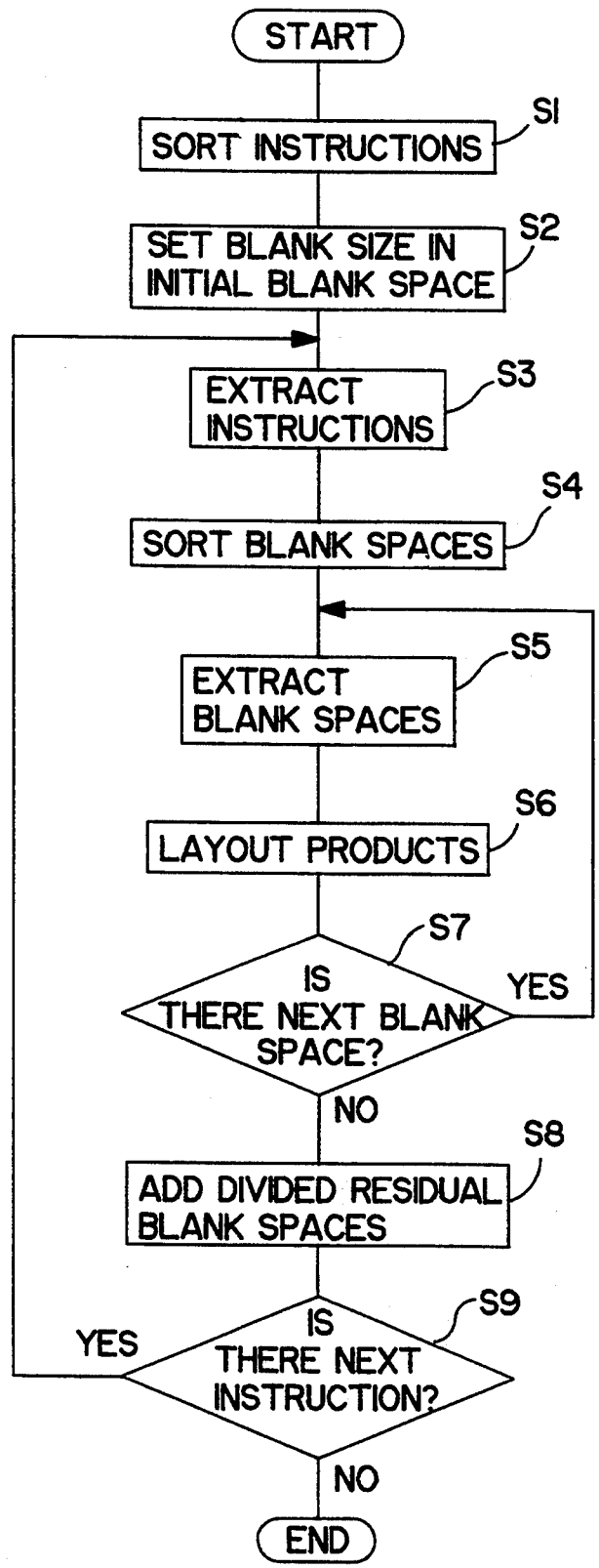
FIG. 1 is a typical flow chart of prior-art blank layout processing.
Figure 2A:
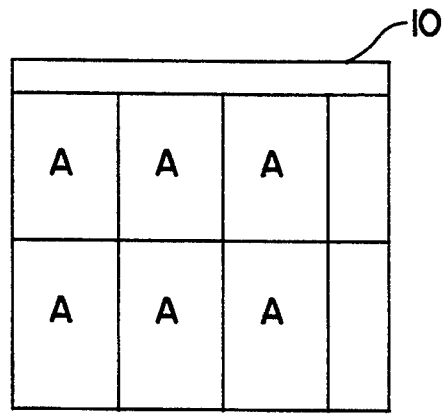
FIGS. 2A and 2B are diagrams of assistance in explaining problems associated with the prior-art blank layout.
Figure 2B:
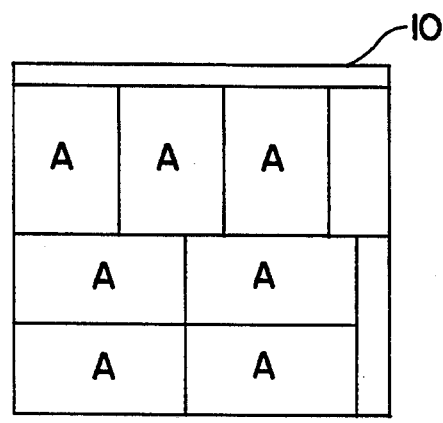
Figure 3:
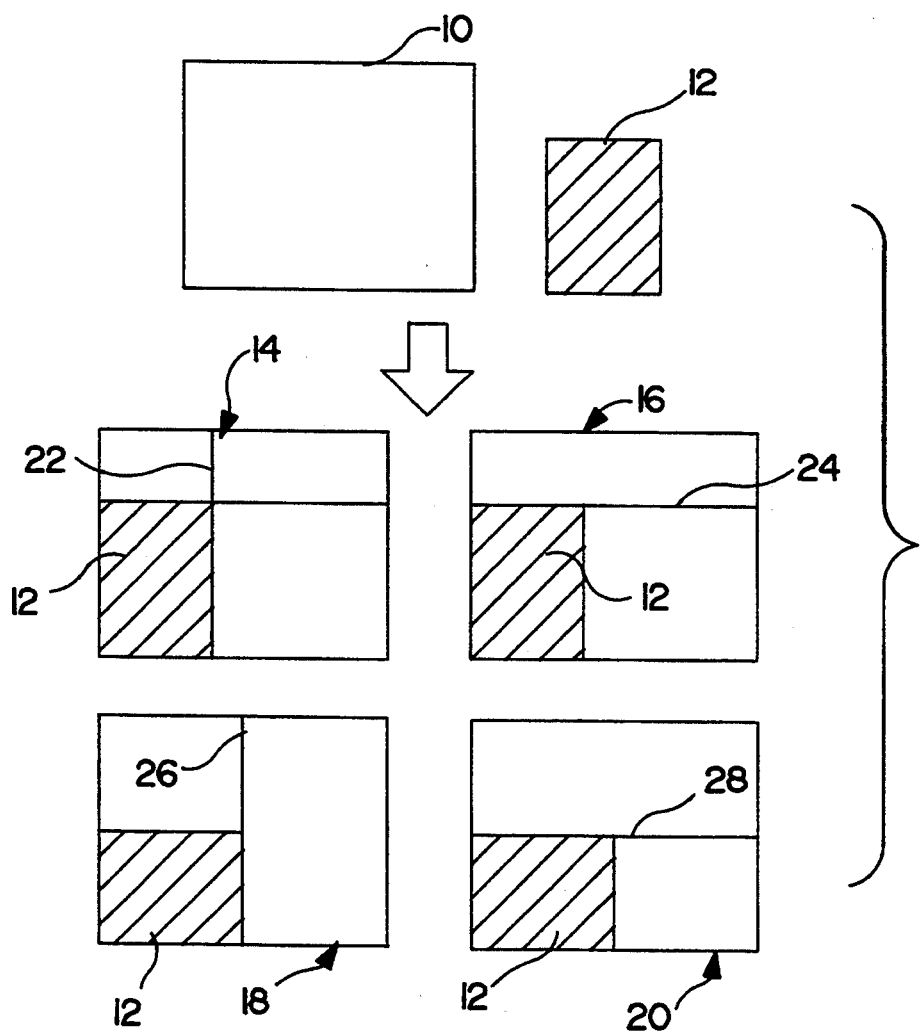
FIG. 3 is a diagram illustrating the method of preparing candidate layout plans according to this invention.

In this invention, when a rectangular product plate 12 is laid out on a rectangular glass blank 10, a plurality of candidate layout plans 14, 16, 18 and 20 are prepared, as shown in FIG. 3. The candidate layout plan 14 is an example in which the product plate 12 is arranged in the longitudinal direction and the cutter line 22 is extended in the longitudinal direction. The candidate layout plan 16 is an example where the product plate 12 is arranged in the longitudinal direction and the cutter line 24 is extended in the transverse direction. The candidate layout plan 18 is an example where the product plate 12 is arranged in the transverse direction and the cutter line 26 is extended in the longitudinal direction. The candidate layout plan 20 is an example where the product plate 12 is arranged in the transverse direction and the cutter line 28 is extended in the transverse direction.

This invention is characterized in that the same processing is recursively repeated for the residual blank space for each of candidate layout plans, and that the final yield at the time when no more product plates can be laid out is compared among the candidate layout plans to select the optimum candidate layout plan having the highest yield. As a result, the deterioration of yield in the prior-art blank layout method can be prevented.

Figure 4:
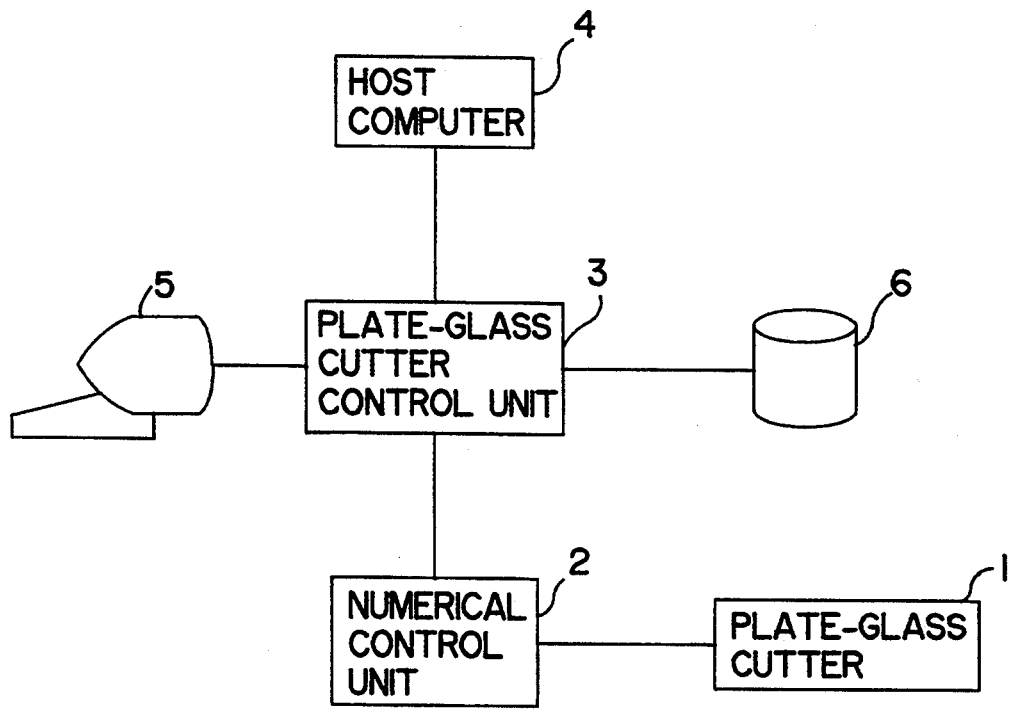
FIG. 4 is a block diagram illustrating a blank layout system used in the blank layout method of this invention.

In the following, the blank layout method of this invention will be described, referring to actual embodiments. A blank layout system for carrying out the blank layout method of this invention is shown in FIG. 4. This blank layout system consists of a plate-glass cutter 1, a numerical control unit 2 for controlling the plate-glass cutter 1, a plate-glass cutter control unit 3 that gives numerical control data to the numerical control unit 2, a host computer 4 that enters data (size, type and quantity) on product plates being laid out into the plate-glass cutter control unit 3, an input unit 5 having a keyboard and CRT monitor, and an external memory 6 for storing product data, etc.

The plate-glass cutter control unit 3 receives data (size, type and quantity) on product plates being laid out from the host computer 4 and prepares the optimum blank layout plan having the highest yield. The data obtained is converted into numerical control data, and output to the numerical control unit 2. On the basis of the data, the plate-glass cutter 1 cuts product plates from the glass blank.

Blank layout in the plate-glass cutter control unit 3 is carried out in the following manner.

Figure 5:
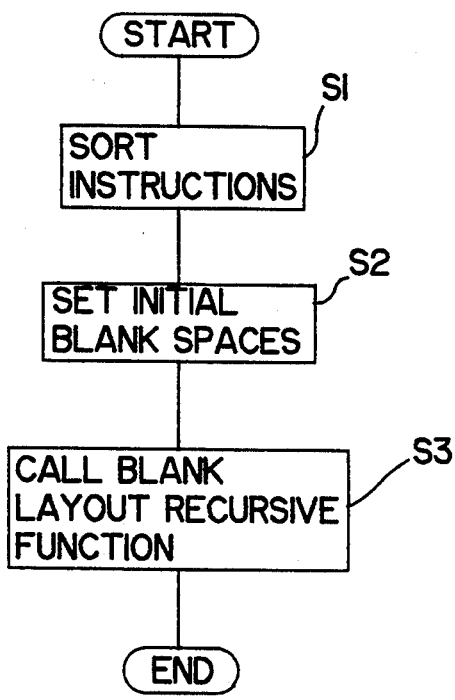
FIG. 5 is a flow chart illustrating the main processing of the blank layout method of this invention.

As shown in the flow chart of the main processing in FIG. 5, the instructions stored in the external memory 6 are sorted in the order of area (STEP S1), the initial blank layout plan having the entire glass blank as a residual blank space is prepared (STEP S2), and a blank layout recursive function, a function for obtaining the candidate layout plan having the highest yield by recursively laying out product plates on the residual blank spaces in the candidate layout plans, is called from the external memory 6.

Figure 6:
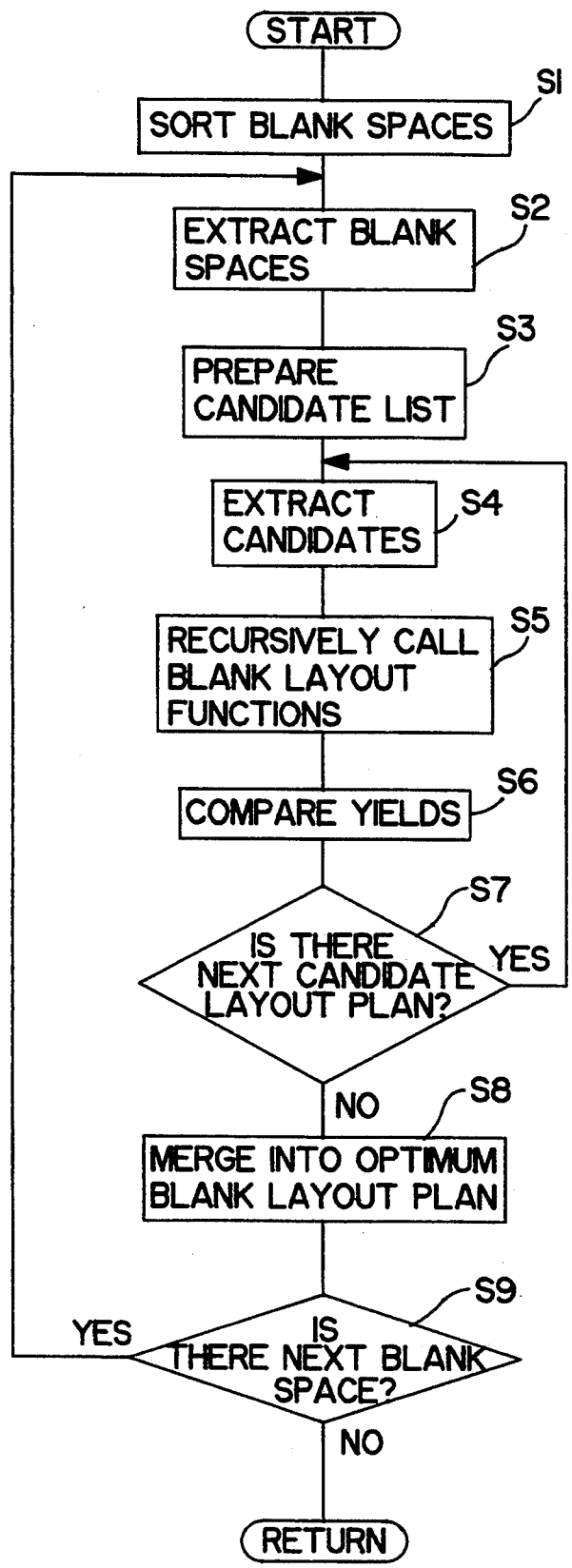
FIG. 6 is a flow chart of a blank layout recursive-function processing.
Figure 7A:
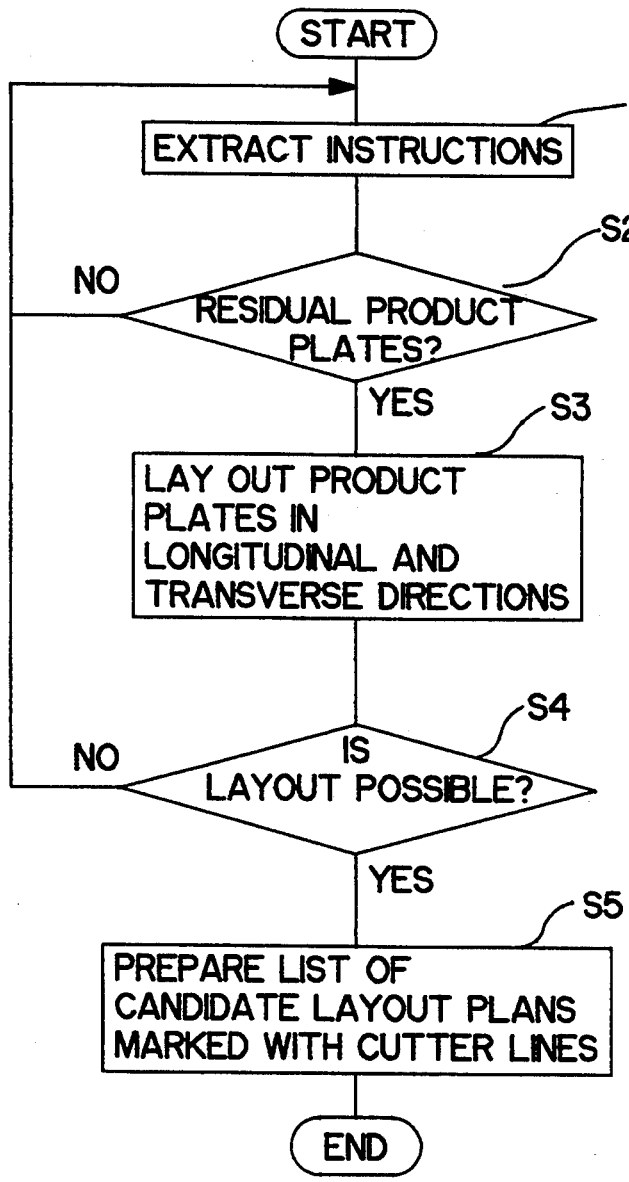
FIGS. 7A, 7B, and 7C constitute a flow chart of a processing for preparing a candidate layout plan list.

Candidate layout plan having a list of products that have been laid out and a list of residual blank spaces divided by cutter lines are passed as arguments to the blank layout recursive function. Layout is then carried out on each residual blank space so as to obtain the highest yield, and a candidate layout plan having updated lists of products and residual blank spaces is returned. A flow chart of a blank layout recursive function processing is shown in FIG. 6, and a flow chart of a processing for preparing a candidate layout list is shown in FIG. 7A. The data structures of candidate layout plans and instructions at that time, and functions in them are shown in FIG. 8.

Figure 8:
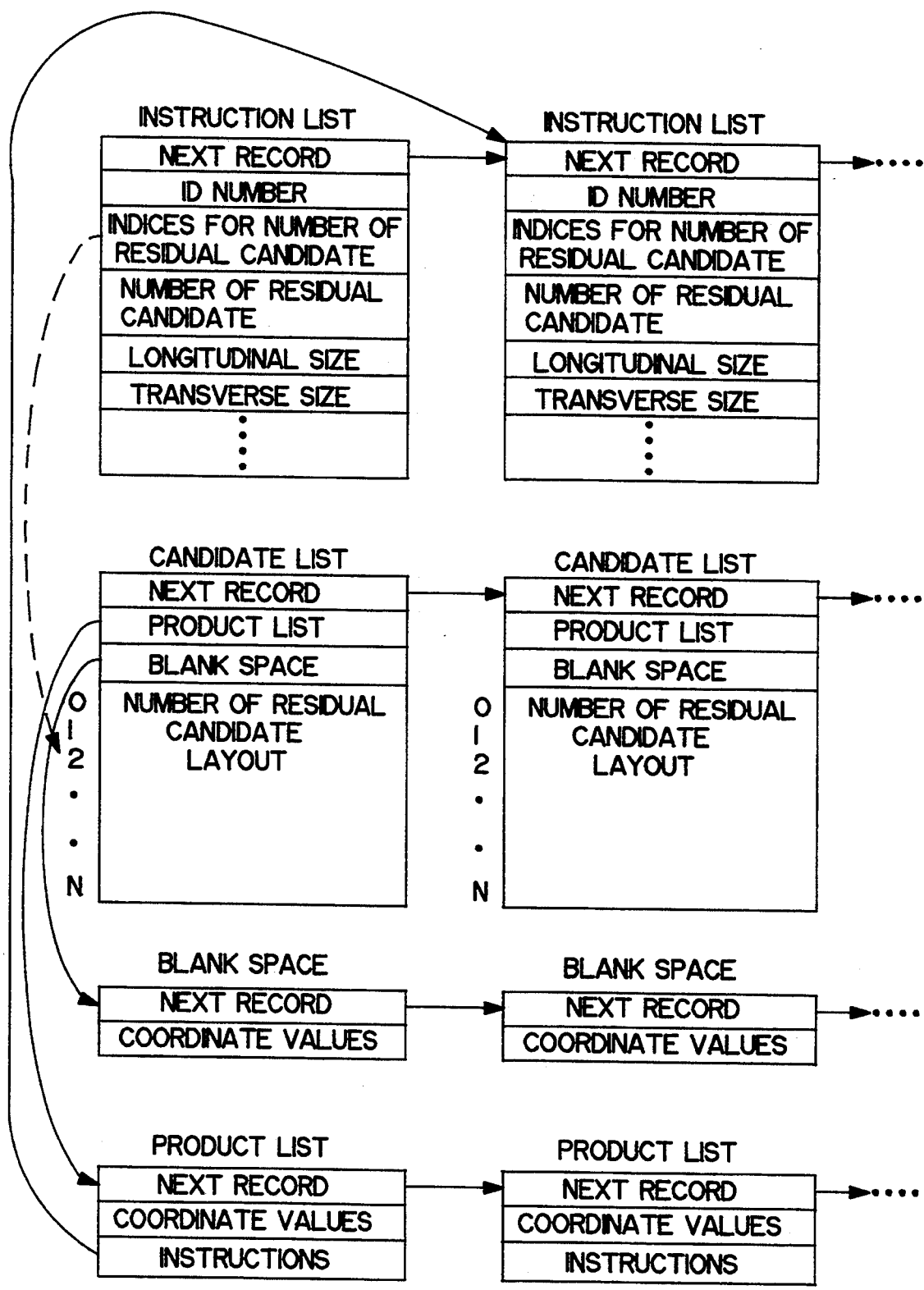
FIG. 8 is a diagram illustrating the data structures of instruction lists and candidate layout plans in blank layout processing, and functions in them.

A candidate layout plan is a data structure having coordinates for product plates that have been laid out, coordinates for the residual blank spaces divided as a result of layout, and the number of residual product plates being cut, as shown in FIG. 8. Instructions for layout of product plates on a glass blank are arranged in a list format in the order of area, as shown in FIG. 8, and indices for the number of residual candidate layout plans represent corresponding indices in the arrangement of the number of residual candidate layout plans.

In FIG. 6, the blank layout recursive-function processing sorts the residual blank spaces in a given candidate layout plan in the ascending order of area (STEP S1) to lay out product plates on the residual blank spaces in that order. First, search is made as to whether a product plate on the instruction list shown in FIG. 8 can be laid out on a residual blank space (STEP S2). If the product plate can be laid out, a list of candidate layout plans is prepared on the basis of the processing shown in the flow chart of FIG. 7A with respect to the layout and cutter-line directions for that product plate (STEP S3).

Figure 7B:
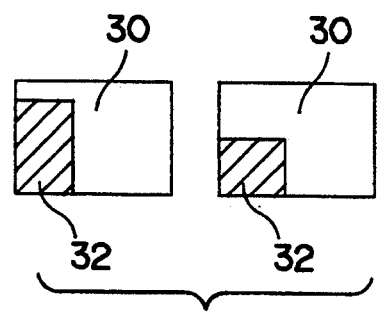
Figure 7C:
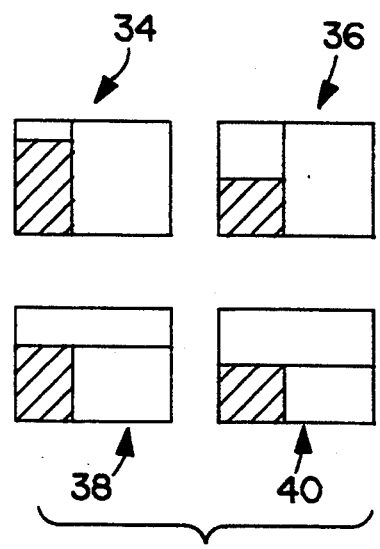

The preparation of candidate layout plans will be described in further detail in accordance with the flow chart of FIG. 7A. An instruction is first extracted (STEP S1) to check the number of residual product plates being laid out (STEP S2). If there are residual product plates, a product 32 is laid out in the longitudinal and transverse directions on a residual blank space 30, as shown in FIG. 7B. Confirmation is made as to whether that layout is possible (STEP S4). If the layout is possible, a list comprising four candidate layout plans 34, 36, 38 and 40, as shown in FIG. 7C, is prepared with respect to the layout and cutter-line directions (STEP S5).

Now, let's return to FIG. 6. When a candidate layout plan list is prepared, candidate layout plans are extracted (STEP S4), blank layout functions are recursively called for all candidate layout plans so that as many product plates as possible are laid out on residual blank space for each candidate layout plan (STEP S5). The yields of the candidate layout plan are compared (STEP S6), and the optimum blank layout plan having the highest yield is selected (STEPS S7 and S8). The list of product plates and residual blank spaces selected is added to the present candidate layout plan, and the same processing is repeated for the next residual blank space (STEP S9). When layout is performed for all residual blank spaces, the candidate layout plan in which product plates are layout at the highest yield among given candidate layout plans is completed. Finally, the resulting candidate layout plan is returned as a feedback value.

Figure 9:
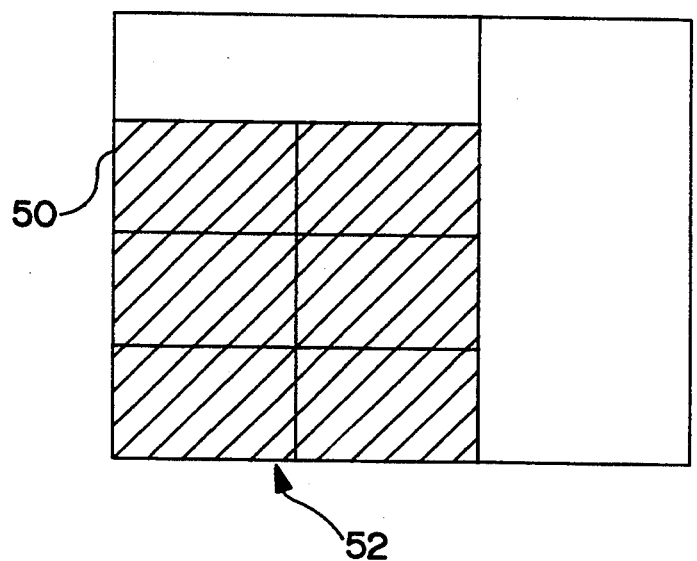
FIG. 9 is a conceptual diagram of a processing in which a group of products of the same type is clustered as a single product.
Figure 10A:
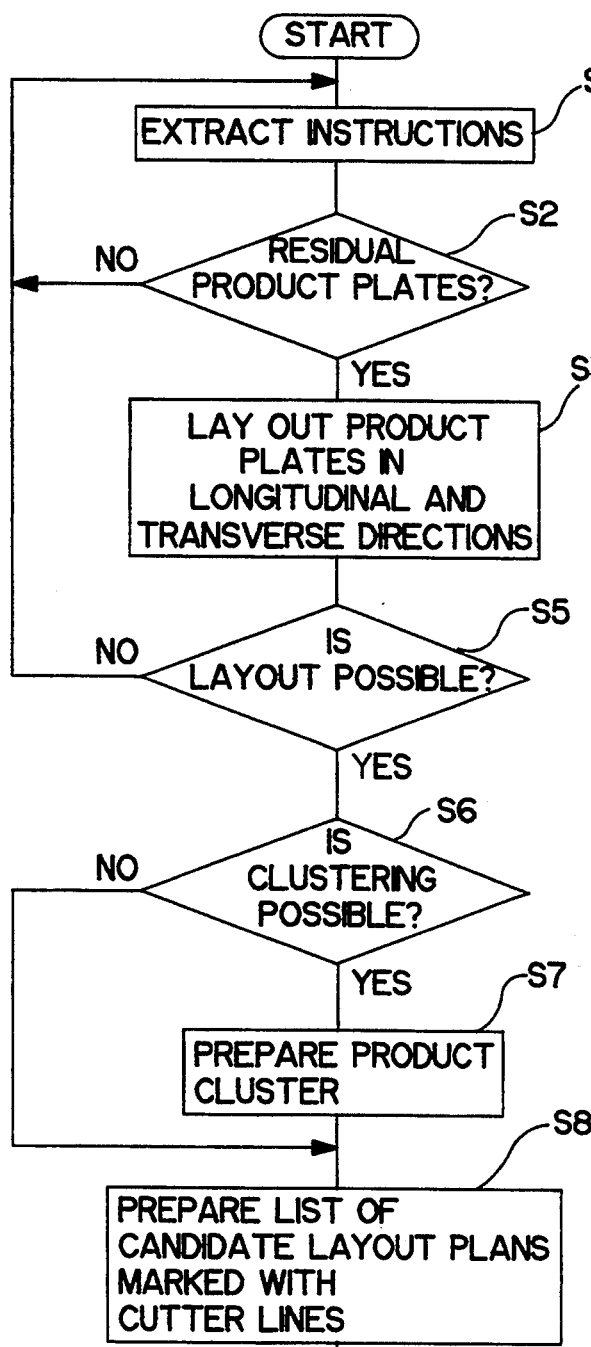
FIGS. 10A, 10B, 10C, and 10D constitute a flow chart of a candidate list preparation processing through clustering.
Figure 10B:
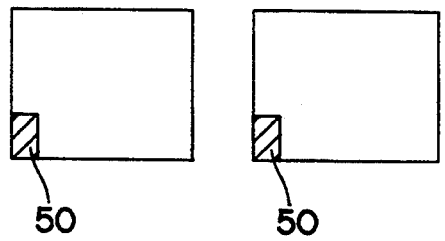
Figure 10C:
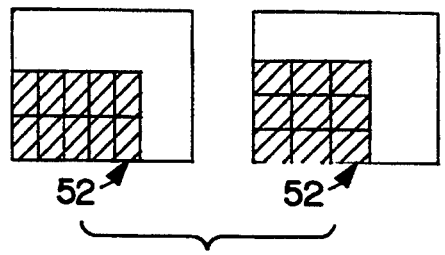
Figure 10D:
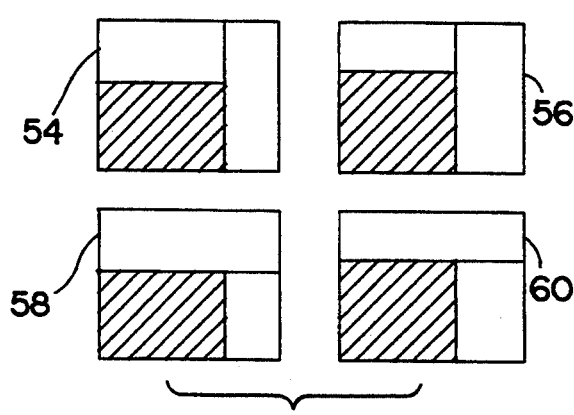

The above-mentioned blank layout method has a disadvantage in that when multiple small product plates are to be laid out, a large number of candidate layout plans have to be prepared, as a result that processing time is sharply increased. This problem can be solved by clustering a plurality of the same products that can be laid out as a single different product. This example is shown in FIG. 9. When a group of small products 50 are clustered into an equivalent product 52, as shown in the figure, the number of candidate layout plans to be prepared is substantially reduced, and as result, processing speed is improved. A typical flow chart of the process in which a group of products are clustered to prepare candidate layout plans is shown in FIG. 10A. STEPS S1 to S5 are identical to STEPS S1 to S5 in the flow chart of the preparation shown in FIG. 4. In STEP S5 in FIG. 10A, if products can be laid out in the longitudinal or transverse direction as shown in FIG. 10B, then whether the products can be clustered or not is judged (STEP S6). If they can be clustered, groups of small products 50 are combined into a cluster 52 as shown in FIG. 10C (STEP S7). As cutter lines are drawn by regarding the cluster 52 as a single product, candidate layout plans 54, 56, 58 and 60 are prepared as shown in FIG. 10D (STEP S8).

In the blank layout method described above, only one instruction is used to prepare candidate layout plans. There may be many cases, however, where better results can be obtained by selecting other instructions. For example, there may be a case where only one piece of product A can be laid out on a glass blank. In such a case, layout yield can be improved by laying out a plurality of smaller product B, instead of product A. This can be easily accomplished by limiting the extraction of instructions of STEP S1 to the number of the maximum specified instruction processing in the processing for preparing candidate layout plans shown in FIG. 7A.

Figure 11A:
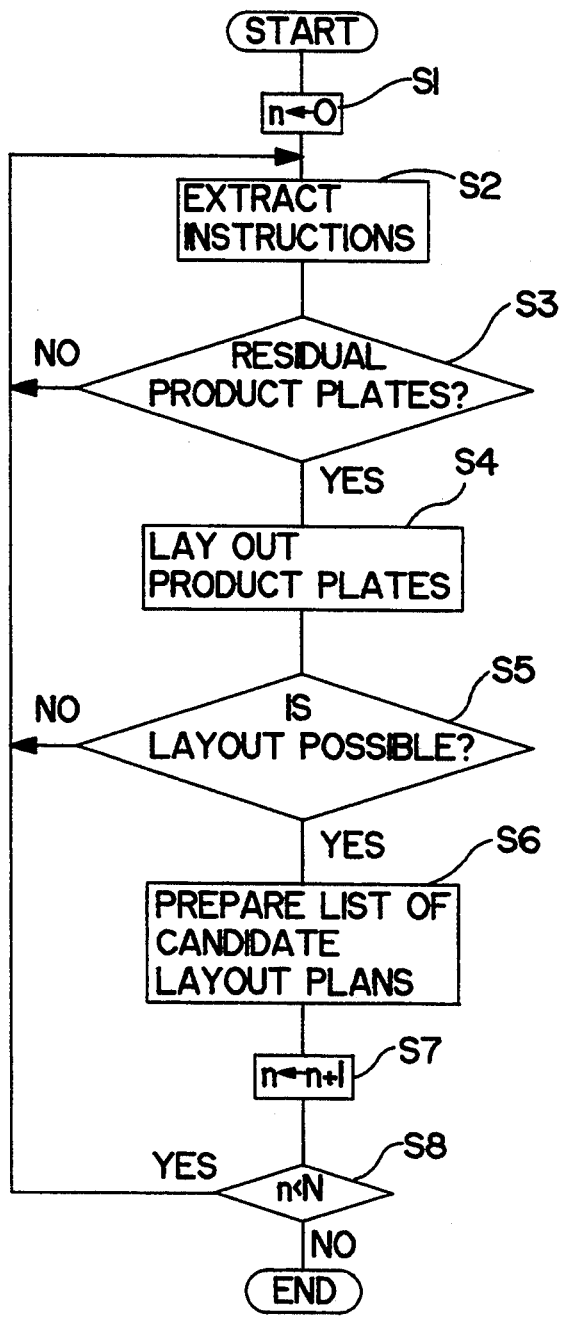
FIGS. 11A, 11B, and 11C constitute a flow chart of a candidate list preparation processing in which candidate layout plans are prepared by changing the types of instructions.
Figure 11B:
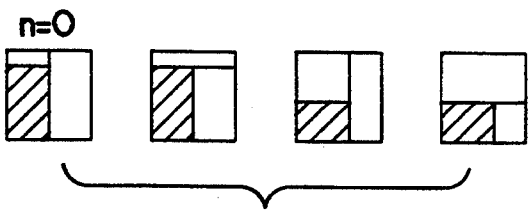
Figure 11C:
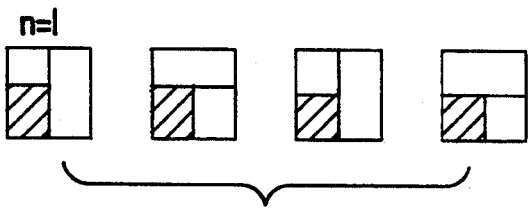

This example is shown in the flow chart of FIG. 11A. When n is the number of instruction processings, and N is the maximum number of instruction processings, n is set to 0 in STEP S1. The following STEPS S2 to S6 are the same as STEPS S1 to S5 in the flow chart of FIG. 7A. Exemplary candidate layout plans when n is set to zero are shown in FIG. 11B. Now, n is set to 1 in STEP S7 in FIG. 11A, and candidate layout plans for this setting are prepared in the same processings as shown in FIG. 11C. In STEP S8, processing is completed when n becomes equal to N.

Figure 12A:
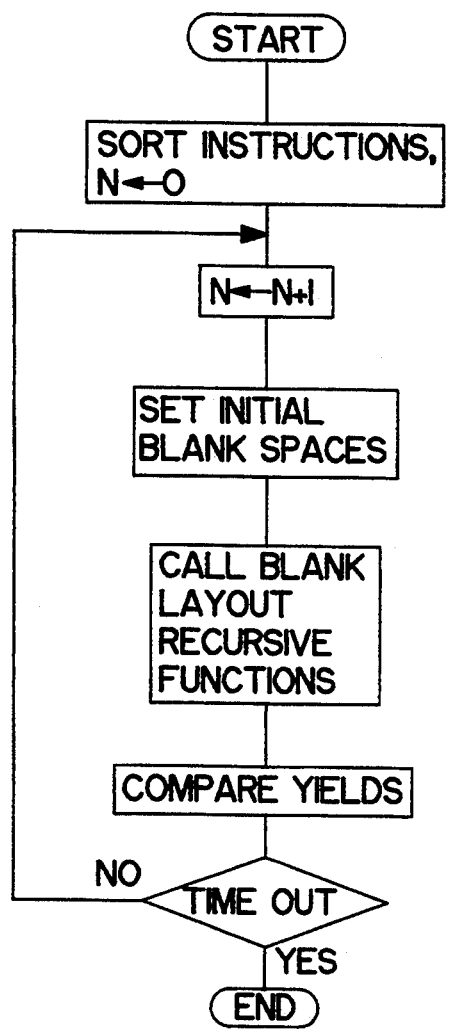
FIGS. 12A and 12B are flow charts of a main blank layout processing and a blank layout recursive-function processing, respectively, when processing time is limited.
Figure 12B:
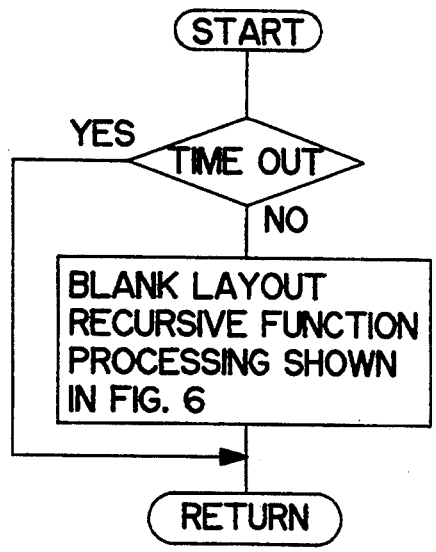

A disadvantage of this processing is that processing time could be increased by increasing the number of instructions to be considered as candidate layout plans, and that blank layout could not be completed within a given processing time in extreme cases. To cope with this, blank layout plans are prepared by setting the maximum number of instructions to be considered to 1, and if there is a room left in processing time, blank layout plans are prepared by increasing the maximum number of instruction processings one by one. Finally, the blank layout plan having the highest yield is selected. With this method, the optimum blank layout plan can be prepared within a given processing time. This limited-time processing can be realized by the blank layout main processing shown in the flow chart of FIG. 12A and the blank layout recursive-function processing shown in the flow chart of FIG. 12B. In the flow chart of FIG. 12A, N denotes the maximum instruction processing.

Figure 13A:
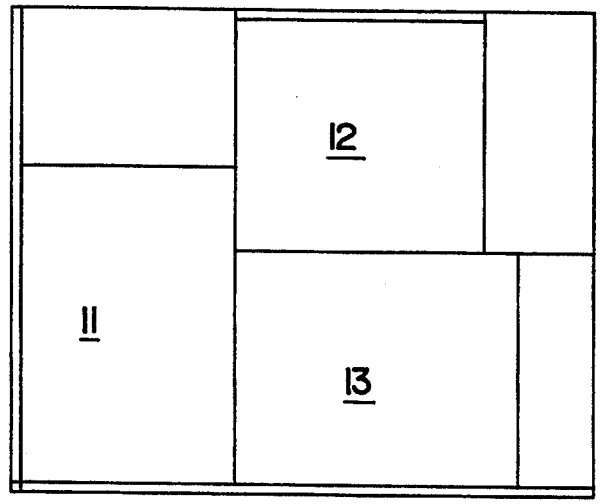
FIGS. 13A and 13B are diagrams comparing the layout results of the prior-art blank layout method and an embodiment of this invention.
Figure 13B:
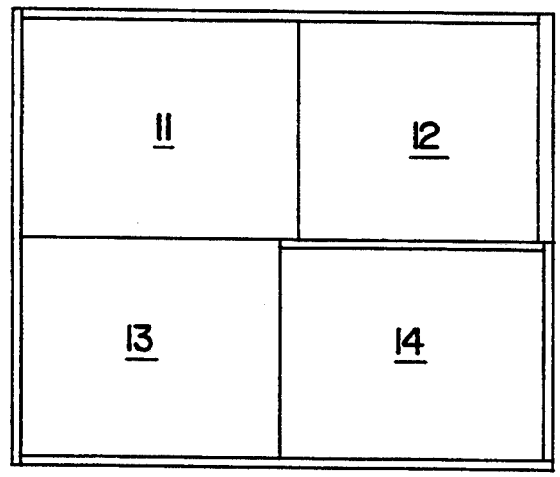
Figure 14A:
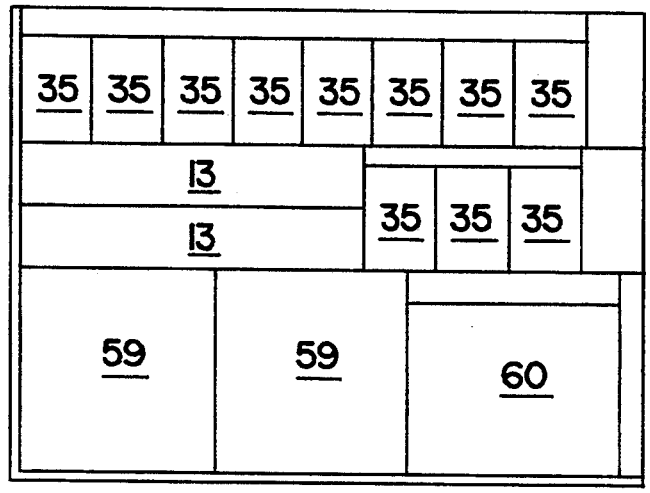
FIGS. 14A and 14B are diagrams comparing the layout results of the prior-art blank layout method and an embodiment of this invention.
Figure 14B:
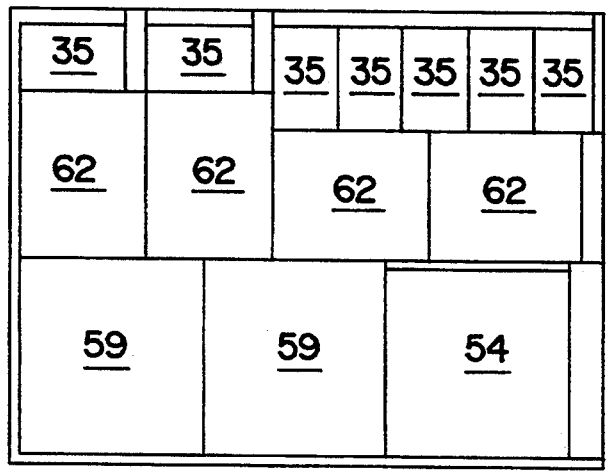

An example of comparison between the blank layout method of this invention and the prior-art blank layout method will be described in the following. FIG. 13A shows the blank layout results of the prior-art blank layout method and FIG. 13B those of the method of this invention, in both of which a 1820×2300 mm glass blank was laid out. In the figures, numerals refer to product numbers, and those having no numbers are residual blank spaces on which no more products could be laid out. With the prior-art method, yield was 69.7%, whereas the yield of the method of this invention was as high as 93.2%, an about 23% improvement. The results of layout on a 1829×2515 mm blank are shown in FIG. 14A for the prior-art method, and in FIG. 14B for the method of this invention. While the yield of the prior-art method was 82.6%, that of the method of this invention was 89.4%, an about 65 improvement.

Although these are concerned with the results of blank layout on a glass blank, the total yield of continuous layout on multiple glass blanks using actual data on requests to cut was also improved with the method of this invention by more than 5% on average, compared with the prior-art method.

We claim:

1. A blank layout method for plate-glass cutters for automatically laying out a plurality of rectangular product plates on a rectangular glass blank, comprising the steps of:

creating candidate layout plans for a first product plate on said glass blank by positioning said plate in a plurality of positions according to the possible combinations of the longitudinal and transverse direction in which said plate is laid out and the longitudinal and transverse direction in which a cutter line is drawn to cut said product plate, said candidate layout plans having a plurality of residual blank spaces divided from said glass blank as said product plate is cut;

creating a candidate layout plan for a second product plate on said residual blank spaces in the same manner as the creation of said candidate layout plans for said first glass plate on said glass blank;

recursively repeating the creation of candidate layout plans for successive product plates on residual blank spaces until no product plate fits on said blank spaces;

determining the final yields of all candidate layout plans; and selecting the layout plan having the highest yield with respect to said glass blank.

2. A blank layout method for plate-glass cutters as set forth in claim 1 wherein said product plate comprises a plurality of product plates of the same type.

3. A blank layout method for plate-glass cutters as set forth in claim 1 wherein said product plates are of varied types.

4. A blank layout method for plate-glass cutters as set forth in claim 3 further comprising setting a processing time, sequentially increasing the types of product plates being cut until said time is expended, and selecting the best blank layout plan by comparing the yields of said blank layout plans prepared during said processing time.

* * * * *